United States Patent [19]

Morrison

[11] Patent Number: 4,824,682

[45] Date of Patent: Apr. 25, 1989

[54] IN-PACKAGE RIPENING OF BLUE CHEESE CURDS

[76] Inventor: Crystal A. Morrison, 19903 Warrington Dr., Detroit, Mich. 48221

[21] Appl. No.: 12,275

[22] Filed: Feb. 9, 1987

[51] Int. Cl.$^4$ .......................................... A23C 19/068
[52] U.S. Cl. ........................................ 426/8; 426/37; 426/62; 426/582; 426/415
[58] Field of Search ...................... 426/8, 409, 34, 410, 426/36, 412, 37, 415, 38, 61, 62, 112, 130, 582, 392

[56] References Cited

PUBLICATIONS

Morrison, "In-Package Ripening of Loose Blue Cheese Curd"; MSU Thesis, 1985.
Bruce Russell Harte, "The Effects of Process Parameters on the Formation of Volatile Acids and Free Fatty Acids in Quick Ripened Blue Cheese", Thesis Abstract, Shelved at Michigan State University.
B. R. Harte and C. M. Stine, "Effects of Process Parameters on Formation on Volatile Acids and Free Fatty Acids in Quick-Ripened Blue Cheese", 1977, J. Dairy Sci., 60:1266–1272.
J. R. Dulley, "The Utilization of Cheese Slurries to Accelerate the Ripening of Cheddar Cheese", The Australian Journal of Dairy Technology, Dec., 1976, pp. 143–148.
E. Kondrup and T. I. Hedrick, "Short Time Curing of Blue Cheese", Quarterly Bulletin, vol. 46, No. 2, Nov., 1963, Michigan State University, pp. 156–158.

*Primary Examiner*—Marianne Cintins

[57] ABSTRACT

A good quality loose curd blue cheese product is prepared by a novel in-package ripening process. Inoculated raw cheese curds sealed in semi-permeable polymer film packaging will cure in 10 to 14 days to provide an economical blue cheese substitute which can be delivered to the customer without further processing or packaging.

7 Claims, 2 Drawing Sheets

IN-PACKAGE RIPENING OF BLUE CHEESE CURDS

BACKGROUND AND SUMMARY OF THE INVENTION

This application relates to a method for preparing quick ripened blue cheese. More particularly, this invention is directed to a method for preparing a loose curd blue cheese product ripened in the same flexible pouch package in which it is shipped, distributed to retail outlets and delivered to the consumer.

The use of blue cheese in salad dressings and cheese dips has increased the demand for a reasonably priced blue cheese product. As with many other traditional food products, spiraling costs of manufacture has encouraged the use of blue cheese flavors as a substitute for the more expensive aged blue cheese product. While submerged culture fermentations have been developed to provide the popular blue cheese flavor, a more popular blue cheese substitute is the so-called "quick ripened" blue cheese where loose cheese curds are inoculated and cured in a loose curd form which can be incorporated into food preparations. Quick ripened blue cheese cures in approximately two weeks as compared to traditional methods which require a three month to one year cure time. While some sacrifice is made with respect to texture and flavor, quick ripened blue cheese products are an economical substitute for use in salad dressings, sauces and appetizers.

Since the principal advantage offered by use of flavor/food substitutes lies in the economy of their production and use, research efforts continue toward development of time saving/cost saving procedures for production of such products. Such research efforts originally led to the concept of quick ripened loose curd blue cheese itself.

However, the procedure for manufacture of quick ripened blue cheese still necessarily utilizes many of the same time consuming and costly processing/packaging steps involved in the manufacture of the traditionally aged blue cheese product. Its only advantage lies in the shortened time of the aging process. The process for manufacture of quick ripened cheese still involves the inoculation of cheese curds, storing of those curds during the approximately two week curing period under controlled conditions of humidity and temperature and finally, packaging the product in containers suitable for distribution to retailers and ultimately to the consumer.

The present invention is directed to an improvement in the manufacture of a packaged quick ripened blue cheese product. Surprisingly, it has been discovered that the curing process for quick ripened blue cheese can be carried out in a sealed package comprising a semi-permeable polymeric film without compromising flavor development and texture of the quick ripened blue cheese product. Thus, loose raw cheese curds inoculated with the appropriate curing organism can be sealed and ripened in the same package used for delivering the quick ripened product to the consumer. In fact, the cheese curing process can take place during the distribution of the product to retail outlets, assuming the sealed product packages are maintained at a temperature conducive to organism growth during the distribution process. Use of the in-package blue cheese ripening method in accordance with the present invention will result in reduced labor and facilities cost for product production, and it will allow the manufacturer to provide more efficiently a quick ripened blue cheese product to the consumer.

It is an object of the present invention, therefore, to provide a cost saving method for the production of quick ripened blue cheese.

It is another object of the present invention to provide a method for producing quick ripened blue cheese by an accelerated in-package ripening process.

It is still a further object of the present invention to identify polymeric film packaging materials for an in-package quick ripened blue cheese product.

Those and other objects of the present invention will be readily apparent from the following detailed description and examples.

DETAILED DESCRIPTION OF THE INVENTION

Figure 1:
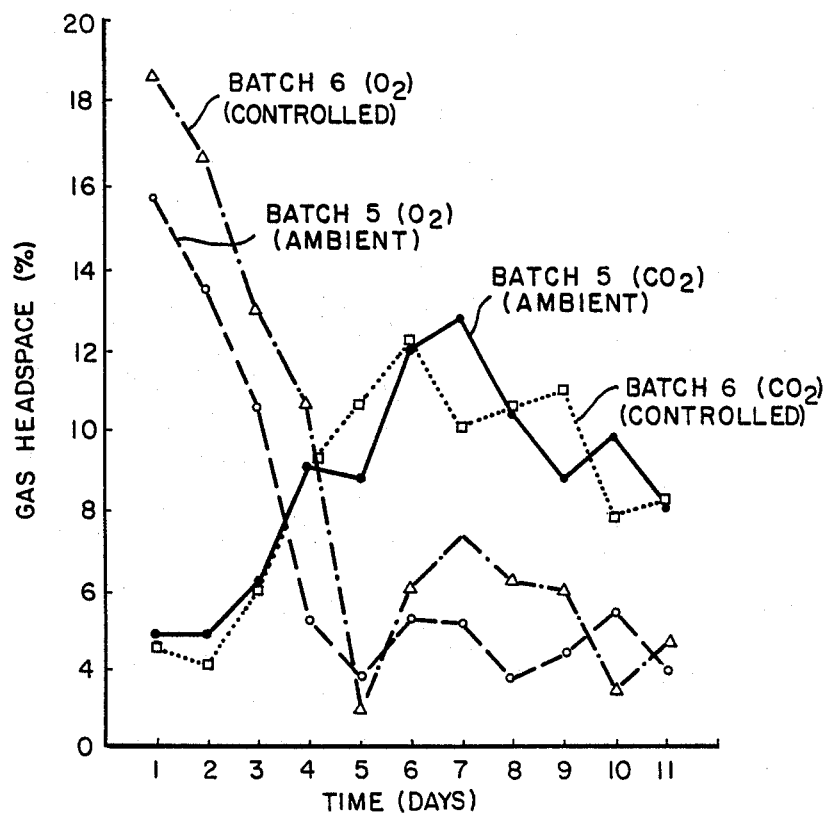
FIG. 1 is a graphical presentation of change in gas headspace during ripening of Blue cheese containing 1% mold spores and 2% salt, packaged under ambient and controlled conditions in LDPE.

The present invention is directed toward preparing an in-package ripened blue cheese product from raw cheese curds. Raw cheese curds incorporated with mold spores of *Penicillium roqueforti* or *Penicillium glaucum* are sealed in a package or pouch formed from a semi-permeable polymeric film or film laminate. Packaging of the inoculated raw cheese curds is conducted under condition so that the void volume in the sealed package (headspace gases) comprises about 20 to about 30% oxygen. The sealed packages are stored at a temperature from about 50 to about 65° F. for a period sufficient to allow necessary mold growth and concomitant flavor development (ripening) in the packaged cheese curds.

Use of the method in accordance with this invention minimizes the risk of unwanted microbial contamination of the cheese prior to packaging. Important, too, under controlled distribution conditions, the product ripening process can be allowed to take place in whole or in part during the product distribution process or just prior to product shipment. The present method allows the cheese manufacturer a more efficient utilization of manufacturing and storage space.

The raw cheese curds used in the present method are prepared in accordance with standard cheese making techniques from pasteurized, homogenized raw milk. To provide a suitable volume to surface area ratio, the cheese curds are usually cut into small pieces having a volume of about 0.125 cc to about 7 cc. The cheese curdsd are inoculated with mold spores selected from *Penicillium roqueforti* or *Penicillium glaucum* either after they are formed from the cheese milk, or the spores are added to the cheese milk prior to curd formation. Inoculation after raw curd formation is accomplished by mixing the sized curds with about 0.1 to about 1% by weight of mold spores.

The inoculated loose raw cheese curds are transferred under controlled atmospheric conditions selected to minimize microbial contamination into pouches or envelopes of a food acceptable packaging material selected from known semi-permeable polymeric films or film laminates. The pouches are hermetically sealed using heat, adhesives or other commercially acceptable sealing techniques.

The polymeric film packaging materials should exhibit some permeability to gases such as carbon dioxide and oxygen to allow the ripening cheese curd sealed within the packages to "breathe" during the ripening process. Exemplary of such materials are low density polyethylene ("LDPE"), polypropylene ("PP") and ethylene vinyl acetate ("EVA"). Preferred packaging materials for use in accordance with this invention are low density polyethylene and polypropylene with low density polyethylene being most preferred. Ethylene vinyl acetate ("EVA") has properties which vary according to the percentages of the monomeric components used to form the polymer. A blend containing 90% ethylene will exhibit gas/water vapor permeability properties close to those measured for polyethylene. Film thicknesses typically range from about 0.5 mil to about 2 mil with about 0.8–1 mil polymeric film being preferred.

Table 1 compares oxygen and moisture transmission rates between EVA and LDPE. Although EVA has a higher permeability rate that LDPE in some instances curds packaged in LDPE ripened sooner than curds in EVA. The two polymers share some similar characteristics, i.e. stretch, cling, and static, but their physical/chemical properties are quite different. The barrier properties of LDPE provided an "in-package" atmosphere conducive to ripening the curds faster than EVA.

TABLE 1

| | OXYGEN AND MOISTURE VAPOR TRANSMISSION OF EVA AND LDPE | |
|---|---|---|
| POLYMER | OXYGEN TRANSMISSION RATE cc/100 in$^2$/24 hrs | MOISTURE VAPOR TRANSMISSION RATE g mil/100 in$^2$/24 hrs |
| EVA | 2220 | 35.5 |
| LDPE | 1930 | 25.5 |

Polyethylene and polypropylene are more hydrophobic than other polymer films; water vapor is quite insoluble in the film and hence penetrates only to a limited degree. This particular property is of considerable value in the packaging of items requiring a low moisture loss, while maintaining the ability to "breathe" with the passage of significant amounts of oxygen or carbon dioxide.

The polymeric film packaging material is typically formed as an envelope or pouch adapted to be sealed by application of heat or adhesives approved for use in packaging of food products.

The composition of the headspace gas in the sealed package at the time of packaging has been found to affect the ripening process. Higher concentrations of oxygen tend to accelerate mold growth while high concentrations of carbon dioxide tend to hinder mold growth and the ripening process. Thus while acceptable ripening will take place in bags packaged under ambient conditions with air (about 21% oxygen) as the headspace gas, gas flush packaging techniques can also be used to provide headspace gases enriched in oxygen. The initial headspace gas composition should comprise about 18 to about 30% oxygen.

During the ripening process, oxygen levels decrease and carbon dioxide levels increase in the package headspace. The use of "semi-permeable" polymer film packaging materials in accordance with this invention allows the headspace gases to equilibrate with the surrounding air. During the ripening process carbon dioxide and oxygen diffuse through the packaging film to allow the mold growth/ripening process to reach an acceptable flavor imparting endpoint. Gas impermeable packaging materials, i.e., materials which will not allow the diffusion of carbon dioxide from the package and oxygen into the package during the ripening process, do not permit the ripening process to proceed to a point where the in-package ripened blue cheese product develops acceptable flavor/textural qualities. Blue cheese in-package ripened in, for example, aluminum foil or foil laminate packaging provided a product which was considered sensorially unacceptable under the conditions studied.

The addition of salt to the raw cheese curds prior to or in conjunction with curd inoculation and packaging also has been found to affect cheese ripening and flavor development. Up to about 4% salt can be added to the cheese curd for flavor enhancement and to inhibit unwanted microbial growth during the ripening process. The addition of about 0–2% salt is preferred.

In-packaging blue cheese ripening in accordance with this invention is typically complete within 7–14 days where the packages are stored at temperatures ranging from about 50 to about 65° F. One method of gauging the progress of the ripening process is to observe the extent to which the mold covers the surface of the packaged cheese curds. Flavor development to a point of threshold acceptability is typically found in packages where the mole has grown to the extent it covers at least 50% of the surface of the inoculated cheese curds. Variations in temperature during the present in-package ripening process will have the same effects as temperature variations will have during the ripening of other cheese products. For example, at lower temperatures the ripening process is inhibited. When the ripening process is judged complete, it can be terminated by refrigeration/freezing of the in-package ripened product.

The present invention is further illustrated by the following representative examples.

EXAMPLES

Preparation of Cheese Curds

Prior to salting and milling, fresh loose cheddar cheese curds were cut into small pieces approximately ¼ inch cubes. *P. roqueforti* spores, (5.80 grams and 11.60 grams) and salt (0%, 1%, or 2%) were then added and thoroughly mixed by hand into the cheese curds (5.0 pounds). All utensils and surrounding areas in contact with the cheese were sanitized with a diluted hypochlorite solution to reduce potential contamination.

The moisture content and the pH of the cheese curds were determined at the onset of the ripening period for each batch of cheese.

Packaging and Storage of Cheese Curds

The prepared loose cheese curds were packaged (¼ lb/pkg.) into previously constructed flexible pouches of LDPE (1.0 mil), EVA (0.8 mil) and pre-formed laminated aluminum foil pouches (6"×8-½").

These materials were chosen because of their flexible nature, their differing gas permeability and their ability to retain moisture. The transparency of LDPE and EVA permitted the ripening process to be monitored without the need to open the package.

Cheese curds were packaged under ambient atmospheric conditions using LDPE and EVA pouches. Cheese curds were also packaged under controlled atmosphere conditions utilizing a gas flush of 30% oxygen and 70% nitrogen in LDPE, EVA and LAF pouches.

Curds packaged in ambient conditions (LDPE and EVA) were sealed with an impulse heat sealer. Curds packaged in LDPE and EVA under controlled atmospheric conditions were sealed with twist ties while scotch tape was used to seal LAF pouches. Each pouch was visually inspected for leaks, holes, wrinkles and any other seal imperfections.

Storage conditions were maintained at approximately 52° F. and 55–60% relative humidity (RH) for the duration of the study.

After the first 24 hours of storage, headspace gas analysis, pH and sensory analysis were performed on the packaged cheese curds. These analyses were performed on a daily basis throughout the ripening process.

Visual changes in the cheese curds and obvious growth of contaminant organisms were noted throughout the duration of the study.

Package Environment

Initially packages were designed and filled under normal atmospheric conditions (approximately 21% oxygen and 79% nitrogen) utilizing a heat seal closure. Packages were also filled under controlled conditions within a glove box with an atmosphere composed of 30% oxygen and 70% nitrogen. Periodically, gas samples were extracted from the glove box and analyzed using a gas chromatograph to ensure that the right concentrations of gases were maintained throughout the packaging procedure.

Cheese curds were packed under elevated levels of oxygen to determine whether or not the ripening rate of the cheese would be affected by increasing the initial oxygen level. Material thickness and package surface area can enhance or decrease the rate of transmission of gases into and out of the package. This could effect the rate of ripening. Therefore, careful control of material thickness and pouch surface area was maintained.

Using a hygrometer inserted into a package, initial and final relative humidity readings confirmed that the atmosphere within the pouch headspace maintained a 90–95% relative humidity.

Salt Concentrations

Several different levels of sodium chloride (0%, 1% and 2%) were added to the non-ripened cheese curds prior to packaging. This was done to determine the effect on ripening of the spore inoculated cheese curds and the growth of contaminant organisms.

Mold Concentrations

The effect of inoculating with differing amounts of *P. roqueforti* spores was evaluated by adding 5.80 grams or 11.60 grams of spores per 5.0 pound batch (dry weight) of curds. *P. roqueforti* spores were obtained as a powdery, freeze dried material from Dairyland (Wisconsin).

After the cheese curds had been prepared and stored, packages were divided into several different batches. As outlined below, the packaging material, amount of salt and/or mold, and the atmosphere in which the curds were packaged determined which batch the curds belonged.

| Low Density Polyethylene | Ethylene Vinyl Acetate |
|---|---|
| BATCH #1 (Control) | BATCH #7 (Control) |
| 0% mold, 0% salt | 0% mold, 0% salt |
| BATCH #2 | BATCH #8 |
| ½% mold, 0% salt | ½% mold, 0% salt |
| BATCH #3 | BATCH #9 |
| 1% mold, 0% salt | 1% mold, 0% salt |
| BATCH #4 | BATCH #10 |
| 1% mold, 2% salt | 1% mold, 1% salt |
| BATCH #5 | BATCH #11 |
| 1% mold, 2% salt | 1% mold, 2% salt |
| BATCH #6 | BATCH #12 |
| (Controlled Atmosphere) | (Controlled Atmosphere) |
| 1% mold, 2% salt | 1% mold, 2% salt |

| Laminated Aluminum Foil (Controlled Atmosphere) |
|---|
| 1% mold, 2% salt |

ANALYTICAL PROCEDURES

Sampling

Each day of the ripening process, a different package of curds from each material (LDPE, EVA and LAF) was obtained from the control chamber and used for sampling.

Moisture Content

The moisture content of the cheese curd was determined by the vacuum oven method (AOAC, 1975). Determinations were made in triplicate and performed initially and at appropriate stages of this study.

pH pH measurements were determined by using an Orion digital pH/mV meter equipped with a glass electrode (Standard Methods for Examination of Dairy Products, 1972). The measurements were made by inserting an electrode into blended cheese samples for 5 minutes. Measurements were taken initially and continued on a daily basis throughout the ripening period for each batch of cheese.

Headspace Analysis

Headspace analysis, using gas chromatography was utilized to determine the concentration of carbon dioxide and oxygen in the packaged cheese curds.

Prior to packaging the curds, Dow Corning silicone rubber was deposited on each pouch. After the rubbery material was cured, a needle (syringe) was inserted through the patch without causing the pouch to tear or leak.

The syringe was filled to the desired volume (approximately 1 cc). The contents of the syringe were then injected into the gas chromatograph (GC) (Packaging 427 Lab Manual, 1982).

Samples were taken in duplicate after 24 hours and on daily basis throughout the ripening period for each batch of cheese.

Hygrometer Analysis

A hygrometer was used to record the relative humidity on the inside of the packaged cheese curds. A sensor was positioned in a LDPE pouch so as not to interfere with the ripening activity, then sealed with Dow Corning silicone rubber.

Measurements of the relative humidity inside the package were taken after the first 24 hours and on the last day of the ripening process.

Sensory Analysis

An experienced cheese judge scored and rated individual packages of cheese. Flavor and color were evaluated. Scores ranged from 1-5, (1, least favorable to 5, most favorable). Each package of cheese was judged at the onset of the study and continued until all samples had been evaluated. Results were not statistically evaluated, but were used to indicate acceptability.

Microbial Observations

Visual inspection of each pouch was made regularly, to detect presence of undesirable contamination by molds, yeasts or bacteria during the ripening period.

These observations were made after 24 hours and continued daily throughout the study. Visual examinations were instrumental in detecting mold growth or spoilage organisms.

Gas headspace analysis

Figure 2:
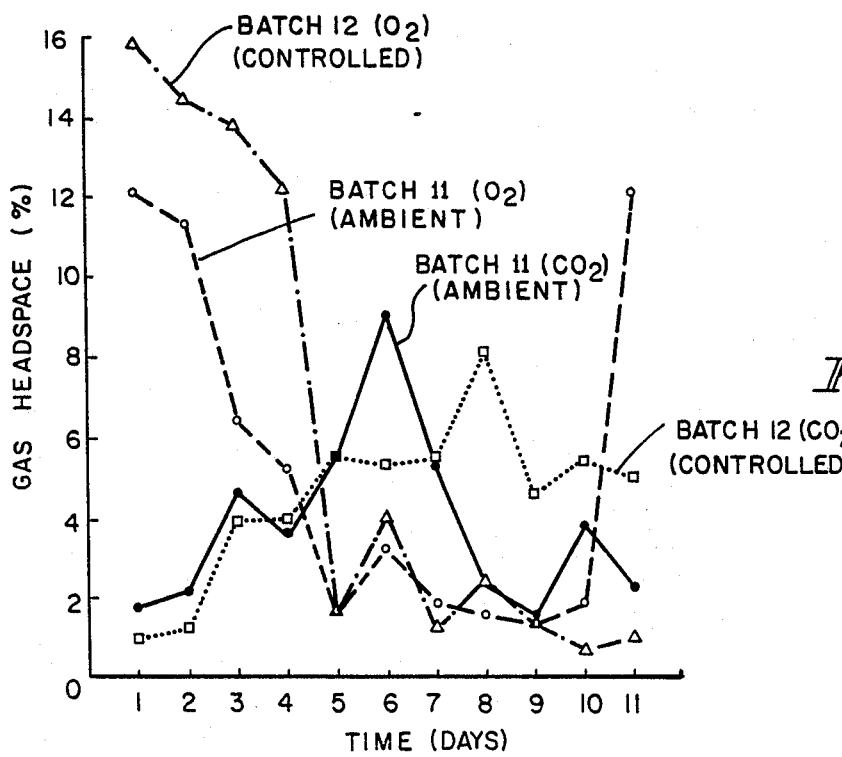
FIG. 2 is a graphical presentation of change in gas headspace during ripening of Blue cheese containing 1% mold spores and 2% salt, packaged under ambient and controlled conditions in EVA.
Figure 3:
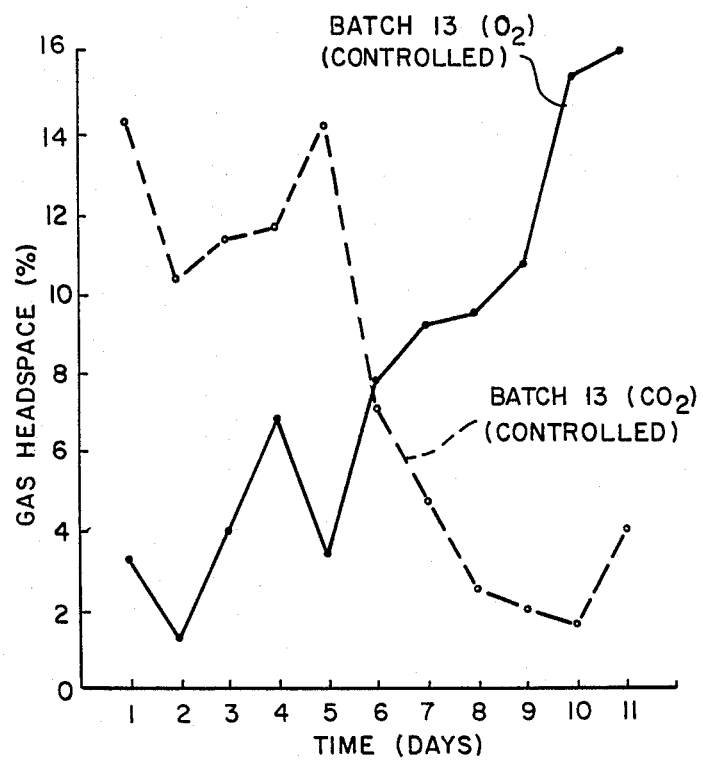
FIG. 3 is a graphical presentation of change in gas headspace during ripening of Blue cheese containing 1% mold spores and 2% salt, packaged under controlled conditions in LAF.

The results of gas headspace analysis for representative Batches are depicted graphically in FIGS. 1-3.

Moisture content

The amount of moisture in cheese influences its rate of ripening, pH, flavor, and nutritive value. Moisture content is important to the consumer and to the cheese maker.

Ability of cheeses to be stored is closely related to the moisture content, acidity, and several other factors that influence maintaining quality. Generally, the higher the moisture and the lower the acidity, the shorter the shelf life.

According to the classification of natural cheeses by hardness and moisture content, commercial blue cheese is considered to be a semi-soft, high moisture (45-55%) cheese.

In this study, the moisture content for each batch of cheese was determined at 3 stages: (1) prior to inoculation and packaging, (2) 24 hours after inoculation and packaging, and (3) upon completion of the ripening period. Results are summarized in Table 2.

For all batches of curd, moisture ranged from 40.0% to 47.4%, from the beginning to the end of storage, respectively. Moisture content was dependent upon the manufacturing process and degree of ripening.

The composition of mold ripened cheeses specified in the Federal Standards of Identity, (21 CFR, Sec. 19.565) is 42 to 46% moisture and not less than 50% fat in the dry matter.

The interrelationship of pH and water activity is of practical importance. As the mold grew, the pH increased. Initially, when the moisture content was high, there was not much mold production, but as the curds began to dry out, mold growth increased. When moisture content was at its lowest level, mold production was usually at its highest.

Although salt and mold slightly influenced the moisture content, different permeability rates of the packaging materials had a greater influence on moisture.

Sensory evaluation

Sensory evaluation is one of the most vital tests that can be performed on any food product. Food products which are intended for commercial consumption should always be evaluated a priori.

TABLE 2

| | Moisture Content of curds packaged in LDPE, EVA and LAF Pouches | | | | | |
|---|---|---|---|---|---|---|
| | LOW-DENSITY POLYETHYLENE | | | ETHYLENE-VINYL ACETATE | | |
| Variables | Prior to inoculation & packaging | 24 hrs after inoculation | End of study | Prior to inoculation & packaging | 24 hrs. after inoculation | End of study |
| 0% MOLD 0% SALT | BATCH 1 46.6% | 46.6% | 46.2% | BATCH 7 46.6% | 46.4% | 45.9% |
| ½% MOLD 0% SALT | BATCH 2 47.1% | 44.2% | 41.2% | BATCH 8 46.8% | 42.8% | 40.3% |
| 1% MOLD 0% SALT | BATCH 3 46.8% | 42.3% | 40.2% | BATCH 9 47.1% | 42.3% | 40.0% |
| 1% MOLD 1% SALT | BATCH 4 46.8% | 44.9% | 41.3% | BATCH 10 47.0% | 44.6% | 41.5% |
| 1% MOLD 2% SALT | BATCH 5 46.5% | 43.1% | 40.4% | BATCH 11 46.4% | 42.6% | 40.4% |
| Controlled ATM 1% MOLD 2% SALT | BATCH 6 46.7% | 42.0% | 42.0% | BATCH 12 47.2% | 44.5% | 40.9% |
| | LAMINATED ALUMINUM FOIL | | | | | |
| | Prior to Inoculation and Packaging | 24 hrs. After Inoculation & Packaging | End of Study | | | |
| Controlled ATM 1% MOLD 2% SALT | BATCH 13 47.4% | 45.5% | 42.6% | | | |

In this study the packages of cheese curds were evaluated for flavor, color, texture and appearance. Flavor is a composite of sensations, of which taste and odor are important components.

Scores for flavor and color ranged from 1 (the least acceptable) to 5 (the most acceptable). Scoring was done by an experienced cheese judge. The closer the cheese curds resembled commercial Blue cheese the higher the scores.

Color and flavor of curds packaged in LDPE

Tables 3 through 8 present color and flavor scores of cheese curds packaged in low-density polyethylene. During initial ripening activity the curds began to have a moldy appearance, with yellow curds turning slightly green with gray specks. The curds required an average of seven days before blue color development was evident.

Curds which contained 0% salt and 1% mold tasted better and had better color than batches with salt. Although salt is added to improve the flavor of cheeses it did not have that effect on these particular batches of curds. Salt is also added to suppress the growth of microorganisms capable of spoiling cheese.

TABLE 3

Sensory Evaluation of Control Curds Packaged in LDPE containing 0% Salt and 0% Mold
BATCH 1

| DAY | COLOR | FLAVOR |
|---|---|---|
| 1 | 1.0 | 1.0 |
| 2 | 1.0 | 1.0 |
| 3 | 1.0 | 1.0 |
| 4 | 1.0 | 1.0 |
| 5 | 1.0 | 1.0 |
| 6 | 1.0 | 1.0 |
| 7 | 1.0 | 1.0 |
| 8 | 1.0 | 1.0 |
| 9 | 1.0 | 1.0 |
| 10 | 1.0 | 1.0 |

TABLE 4

Sensory Evaluation of Curds Packaged in LDPE containing 0% Salt and ½% Mold
BATCH 2

| DAY | COLOR | FLAVOR |
|---|---|---|
| 1 | 1.0 | 1.0 |
| 2 | 1.0 | 1.0 |
| 3 | 1.0 | 1.0 |
| 4 | 1.5 | 2.0 |
| 5 | 2.0 | 2.0 |
| 6 | 2.5 | 2.5 |
| 7 | 2.5 | 3.0 |
| 8 | 2.5 | 2.0 |
| 9 | 2.5 | 2.0 |
| 10 | 2.0–2.5 | 2.5 |
| 11 | 2.5 | 3.0 |
| 12 | 2.5 | 3.0 |
| 13 | 2.5 | 2.5–3.0 |

TABLE 5

Sensory Evaluation of Curds Packaged in LDPE containing 0% Salt and 1% Mold
BATCH 3

| DAY | COLOR | FLAVOR |
|---|---|---|
| 1 | 1.0 | 1.0 |
| 2 | 1.0 | 1.0 |
| 3 | 1.0 | 1.0 |
| 4 | 1.0–1.5 | 1.0 |
| 5 | 1.0–1.5 | 2.0 |
| 6 | 2.0 | 2.0 |
| 7 | 2.0–2.5 | 2.5 |
| 8 | 3.5–4.0 | 3.0 |
| 9 | 3.5–4.0 | 3.0 |
| 10 | 3.5–4.0 | 3.0 |
| 11 | 4.0 | 3.0 |
| 12 | 4.0–5.0 | 3.0 |
| 13 | 4.0–5.0 | 2.5–3.0 |
| 14 | 4.0–5.0 | 3.0 |

TABLE 6

Sensory Evaluation of Curds Packaged in LDPE containing 1% Salt and 1% Mold
BATCH 4

| DA | COLOR | FLAVOR |
|---|---|---|
| 1 | 1.0 | 1.0 |
| 2 | 1.0 | 1.0 |
| 3 | 1.0 | 1.0 |
| 4 | 1.0 | 1.0 |
| 5 | 1.0 | 1.0 |
| 6 | 1.5 | 1.0 |
| 7 | 1.5–2.0 | 1.0–1.5 |
| 8 | 1.5–2.0 | 1.0–1.5 |
| 9 | 3.0 | 1.5 |
| 10 | 3.0 | 1.5 |
| 11 | 3.0–3.5 | 1.5–2.0 |
| 12 | 3.5 | 1.5–2.0 |

TABLE 7

Sensory Evaluation of Curds Packaged in LDPE containing 2% Salt and 1% Mold
BATCH 5

| DAY | COLOR | FLAVOR |
|---|---|---|
| 1 | 1.0 | 1.0 |
| 2 | 1.0 | 1.0 |
| 3 | 1.0 | 1.0 |
| 4 | 1.0 | 1.0 |
| 5 | 1.0 | 1.0 |
| 6 | 1.0–1.5 | 1.0–1.5 |
| 7 | 1.5–2.0 | 1.5–2.0 |
| 8 | 2.0 | 2.0 |
| 9 | 2.5–3.0 | 2.0 |
| 10 | 3.0 | 2.0–2.5 |
| 11 | 3.5–4.0 | 2.5–3.0 |
| 12 | 3.5–4.0 | 3.0 |

TABLE 8

Sensory Evaluation of Curds Packaged in LDPE, Under Controlled Atmosphere, Containing 2% Salt and 1% Mold
BATCH 6

| DA | COLOR | FLAVOR |
|---|---|---|
| 1 | 1.0 | 1.0 |
| 2 | 1.0 | 1.0 |
| 3 | 1.0 | 1.0 |
| 4 | 1.5 | 1.5 |
| 5 | 1.5 | 1.5 |
| 6 | 2.0 | 2.0 |
| 7 | 3.5–4.0 | 4.0 |
| 8 | 3.5–4.0 | 3.5 |
| 9 | 3.5–4.0 | 3.5–4.0 |
| 10 | 3.0 | 3.0–3.5 |
| 11 | 3.0 | 3.0–3.5 |
| 12 | 3.0–3.5 | 3.5 |
| 13 | 3.5 | 3.5–4.0 |
| 14 | 4.0 | 3.5–4.0 |

Curds with 2% salt had no visible signs of growth by spoilage organisms.

Although some batches (i.e. BATCH 4) received above average color scores, the flavor scores were below average. Therefore color and flavor were determined to be independent variables.

Curds packaged in controlled atmosphere showed initial changes in color and flavor sooner than the other batches, definite blue color also developed sooner. Even though curds became over-grown with mold, and powdery, the texture remained firm throughout storage. The 2% salt possibly discouraged spoilage organisms from growing. pH values were stable. The higher oxygen levels had a definite impact on flavor development and on the rate that the cheese curds turned blue.

The accelerated conditions encouraged mold to sporulate and according to flavor scores, resulted in an acceptable tasting "in-package" ripened Blue cheese.

Color and flavor of curds packaged in EVA

Tables 9 through 12 present color and flavor scores of cheese curds packaged in ethylene vinyl acetate. With initial ripening of these curds slight hints of blue or gray hues developed. The texture was fuzzy/hairy until curds became powdery.

Curds which contained 0% salt and ½% mold, tasted better than some of the other batches that contained salt and 1% mold. This batch also produced enough color to be favorably compared to other batches

TABLE 9

Sensory Evaluation of Control Curds Packaged in EVA containing 0% Salt and 0% Mold
BATCH 7

| DAY | COLOR | FLAVOR |
|---|---|---|
| 1 | 1.0 | 1.0 |
| 2 | 1.0 | 1.0 |
| 3 | 1.0 | 1.0 |
| 4 | 1.0 | 1.0 |
| 5 | 1.0 | 1.0 |
| 6 | 1.0 | 1.0 |
| 7 | 1.0 | 1.0 |
| 8 | 1.0 | 1.0 |
| 9 | 1.0 | 1.0 |
| 10 | 1.0 | 1.0 |

TABLE 10

Sensory Evaluation of Curds Packaged in EVA containing 0% Salt and ½% Mold
BATCH 8

| DA | COLOR | FLAVOR |
|---|---|---|
| 1 | 1.0 | 1.0 |
| 2 | 1.0 | 1.0 |
| 3 | 1.0 | 1.0 |
| 4 | 1.5 | 1.5-2.0 |
| 5 | 3.0 | 2.5 |
| 6 | 3.5 | 2.5 |
| 7 | 3.0 | 3.0 |
| 8 | 3.0 | 2.0 |
| 9 | 4.0-5.0 | 3.0 |
| 10 | 4.0-5.0 | 3.5 |
| 11 | 3.0 | 3.0 |
| 12 | 4.0 | 3.0 |
| 13 | 4.0 | 3.5 |

TABLE 11

Sensory Evaluation of Curds Packaged in EVA containing 0% Salt and 1% Mold
BATCH 9

| DAY | COLOR | FLAVOR |
|---|---|---|
| 1 | 1.0 | 1.0 |
| 2 | 1.0 | 1.0 |
| 3 | 1.0 | 1.0 |
| 4 | 1.0 | 1.0 |
| 5 | 1.0-1.5 | 1.0 |
| 6 | 2.0-2.5 | 2.0 |
| 7 | 3.5 | 2.0-2.5 |
| 8 | 3.5 | 2.0-2.5 |
| 9 | 3.0-3.5 | 2.5 |
| 10 | 3.0-3.5 | 2.5 |
| 11 | 4.0-5.0 | 3.0 |
| 12 | 4.0-5.0 | 3.0 |
| 13 | 4.0-5.0 | 3.0 |
| 14 | 4.0-5.0 | 2.5-3.0 |

TABLE 12

Sensory Evaluation of Curds Packaged in EVA Containing 1% Salt and 1% Mold
BATCH 10

| DA | COLOR | FLAVOR |
|---|---|---|
| 1 | 1.0 | 1.0 |
| 2 | 1.0 | 1.0 |
| 3 | 1.0 | 1.0 |
| 4 | 1.0 | 1.0 |
| 5 | 1.0 | 1.0 |
| 6 | 1.0 | 1.0 |
| 7 | 1.0 | 1.0 |
| 8 | 1.0 | 1.0 |
| 9 | 1.0-1.5 | 1.0-1.5 |
| 10 | 1.5 | 1.0-1.5 |
| 11 | 1.5-2.0 | 1.5 |
| 12 | 1.5-2.0 | 1.5-2.0 | that contained 1% mold. The lack of salt did not have a negative influence on the taste, in fact, the peppery/sharp taste that makes Blue cheese desirable was enhanced.

Scores for curds with 1% salt and 1% mold remained below average from the beginning until the end of storage; none of the scores exceeded 2.0. Improper mixing or pre-package spoilage organisms could have been responsible for the low scores. This batch was considered unpalatable.

Batches which contained the least and the most amount of salt were considered favorable. Curds with 0% salt allowed flavor to become distinct; 2% salt discouraged initial spoilage organisms and produced an acceptable tasting curd.

In this particular case, curds packaged in controlled atmosphere did not produce definite blue color as quickly as curds packaged in ambient conditions. But as ripening progressed, mold eventually grew and the curds became excessively powdery. Accelerated conditions did not significantly improve flavor, but curds received above average scores, and would appeal to consumers. Near the end of the study, the texture changed from firm to soft. The 70% nitrogen used to help control the package's atmosphere did not prevent spoilage organisms from occurring.

End of storage results revealed changes in texture and consistency. The curds became soft and mushy; this was the first macroscopic indication of spoilage organisms. All curds packaged in EVA became soft or mushy by the end of storage. Of the three packaging materials used in this study, EVA has the highest water-vapor transmission rate.

Color and flavor of curds packaged in LAF

Table 13 presents, color and flavor scores for cheese curds packaged in LAF. As early as DAY 4, color scores improved significantly, with slight improvements in flavor. Above average color scores were achieved and maintained throughout storage, while flavor scores remained average until the end of storage. Curds packaged in this controlled atmosphere did not become soft or mushy. However, the curds became excessively powdery and dry. Even distribution of mold and good blue color could easily account for the high scores in color, but it was determined that high color scores did not necessarily dictate high flavor scores. Perhaps the curds turned blue too rapidly, and the mold did not have the opportunity to properly ripen and mellow the curds, therefore flavor did not fully develop.

TABLE 13

Sensory Evaluation of Curds Packaged
in Aluminum Foil, Under Controlled
Atmosphere, Containing 2% Salt and 1% Mold
BATCH 13

| DAY | COLOR | FLAVOR |
|---|---|---|
| 1 | 1.0 | 1.0 |
| 2 | 1.0 | 1.0 |
| 3 | 1.0 | 1.0 |
| 4 | 2.5 | 1.5 |
| 5 | 2.5–3.0 | 1.5 |
| 6 | 3.0–3.5 | 1.5 |
| 7 | 4.0 | 2.0 |
| 8 | 4.0 | 2.0 |
| 9 | 4.0 | 2.5–3.0 |
| 10 | 4.0 | 2.5–3.0 |
| 11 | 4.0 | 2.5 |
| 12 | 4.0 | 2.5 |
| 13 | 4.0 | 2.5 |
| 14 | 4.0 | 2.5 |

I claim:

1. A method for preparing an in-package ripened blue cheese product from raw cheese curd, said method comprising forming raw cheese curds each having a surface and an average volume of about 0.125 cc to about 7 cc and inoculating said raw cheese curds with mold spores in an amount effective to initiate mold growth, said mold spores selected from the group consisting of *Penicillium roqueforti* and *Penicillium glaucum*, sealing said inoculated raw cheese curds in a container comprising a semi-permeable polymeric film or film laminate, said container having an initial headspace gas composition comprising about 20 to about 30% oxygen, and maintaining said sealed, inoculated cheese curd-containing packages at a temperature of about 50 to about 65° F. until mold has grown to cover at least 50% of the surface of said inoculated cheese curds.

2. The method of claim 1 wherein up to about 2% salt is added to the inoculated raw cheese curd.

3. The method of claim 1 wherein the polymeric film or film laminate comprises low density polyethylene or ethylene vinyl acetate.

4. The method of claim 1 wherein the in-package ripened blue cheese product is stored at about 52 to about 60° F. for about 7 to 10 days.

5. The method of claim 2 wherein the container comprises a low density polyethylene film.

6. The method of claim 2 wherein the initial headspace gas composition is comprised of about 21% to about 30% oxygen.

7. The method of claim 1 wherein the raw cheese curds are formed from a cheese milk inoculated with *Penicillium roqueforti*.

* * * * *